United States Patent [19]
Hung et al.

[11] Patent Number: 5,162,414
[45] Date of Patent: Nov. 10, 1992

[54] PREPARATION OF INTERPENETRATING POLYMER NETWORK COMPOSITION

[75] Inventors: Jui-Chi Hung; Shih-June Tsai; Shen-Nan Tong, all of Hsin Chu; Peter T. K. Wu, Taipei, all of Taiwan

[73] Assignee: Industrial Technology Research Institute, Hsinchu, Taiwan

[21] Appl. No.: 298,450

[22] Filed: Jan. 17, 1989

[51] Int. Cl.$^5$ .................. C08K 5/13; C08L 51/00; B32B 27/06
[52] U.S. Cl. .................. 524/345; 524/349; 524/464; 524/539; 524/541; 521/48.5; 428/480
[58] Field of Search .......... 521/48, 48.5; 524/345, 524/349, 464, 539, 541; 428/305.5, 308.4, 480

[56] References Cited
U.S. PATENT DOCUMENTS

| | | | |
|---|---|---|---|
| 3,804,811 | 4/1974 | Rose et al. | 521/48 |
| 4,302,553 | 11/1981 | Frisch et al. | 525/31 |
| 4,500,689 | 2/1985 | Thomas | 524/539 |
| 4,598,110 | 7/1986 | Koyama et al. | 524/539 |
| 4,656,206 | 4/1987 | Carter | 524/539 |
| 4,713,310 | 12/1987 | Horie | 524/539 |
| 4,752,532 | 6/1988 | Starka | 524/539 |

FOREIGN PATENT DOCUMENTS
0094381 8/1978 Japan .................. 521/48.5

*Primary Examiner*—Kriellion S. Morgan
*Attorney, Agent, or Firm*—Darby & Darby

[57] ABSTRACT

Interpenetrating polymer network composition, of shaped solid polyester material, e.g. new or reused polyester containing particles, sheeting, fiber or fiber fabric, in a matrix of curable prepolymer resin, e.g. a thermosetting phenol-aldehyde resin of basic pH for providing a flame retardant composition, an interfacial dissolving agent for the polyester material, e.g. an aromatic alcohol and/or a halohydrocarbon, optionally an accelerator for the resin, e.g. a weak acid, and optionally a filler, e.g. in a weight ratio of matrix to polyester material of about 0.25-15:1, wherein the polyester material is distributed, e.g. dissolved, in the manner of a filler in random directional spatial orientation in the matrix and/or preferably is polyester containing linear fiber or fiber fabric arranged as structually reinforcing material in definite directional spatial orientation in the matrix, the composition being consolidated and heat cured to form a prepreg product, and then hot compression molded to form a finally cured, especially flame retardant, structural product.

18 Claims, 1 Drawing Sheet

FIG. 1
FIG. 2
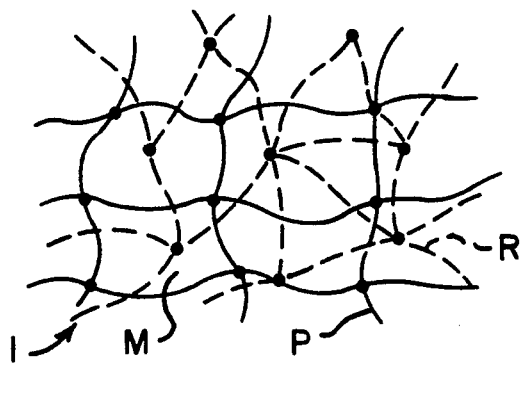
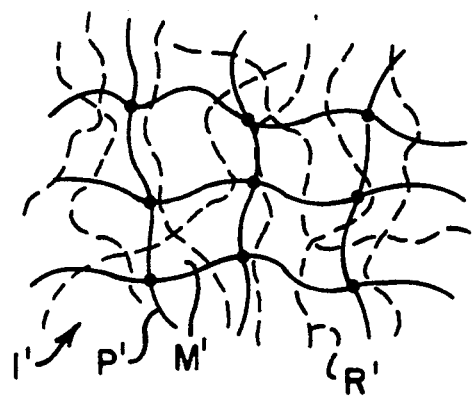
FIG. 3
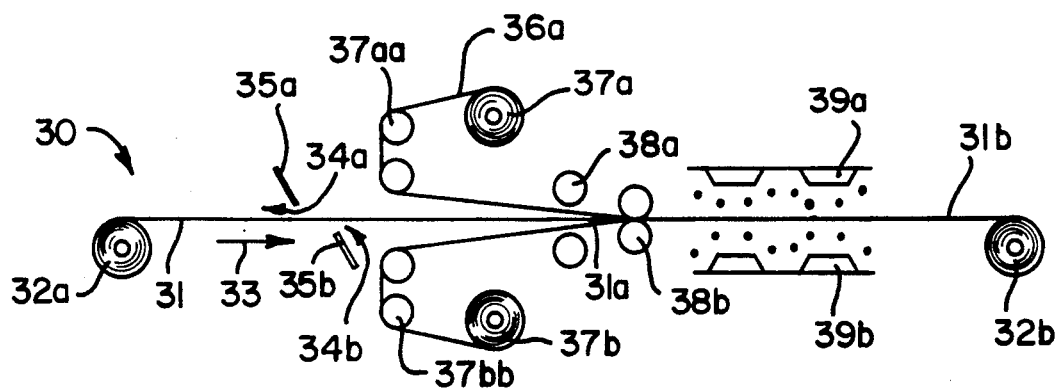
FIG. 4
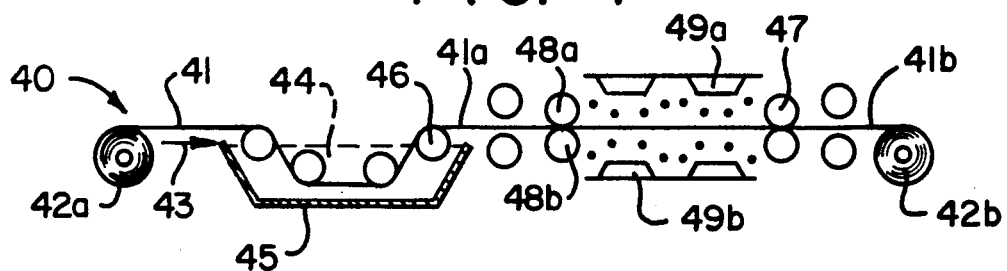
FIG. 5
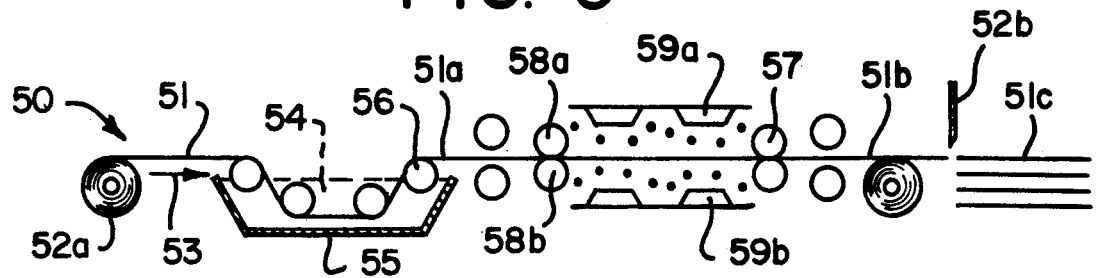

PREPARATION OF INTERPENETRATING POLYMER NETWORK COMPOSITION

FIELD AND BACKGROUND OF THE INVENTION

Interpenetrating polymer network (IPN) compositions have been developed in the prior art over the past several decades, and many types of IPN compositions have been published in the literature, but few of them have been commercialized. Basically, an IPN composition consists of at least two types of polymers, in which heretofore one was synthesized in the presence of the other as an already synthesized polymer, or both were simultaneously synthesized through different mechanisms, to form a network wherein the two types of polymer chains become interpenetrated with each other.

From a chemical standpoint, an IPN composition is a whole unit structure formed of two entirely different types of polymers, thereby having the physical properties of both polymers, and thus combining the advantages of both polymers.

BRIEF DESCRIPTION OF THE DRAWINGS

FIG. 1 is a schematic representation of the structure of an IPN composition of two independent cross linking polymer networks interpenetrating with each other in a matrix;

FIG. 2 is a schematic representation of the structure of a semi-IPN composition wherein an independent cross linking polymer network is interpenetrated with a linear polymer in a matrix;

FIG. 3 is a schematic flow diagram of the coating process operation used to produce a tack-free, partially cross linked semi-finished prepreg product according to the invention;

FIG. 4 is a schematic flow diagram of the dipping process operation used to produce a tack-free, partially cross linked semi-finished prepreg product according to the invention; and FIG. 5 is a schematic flow diagram of a process operation similar to FIG. 4, but in which the product is cut into short lengths.

DESCRIPTION OF THE INVENTION

This invention relates to an interpenetrating polymer network (IPN) composition, especially a flame retardant composition, e.g. for providing structurally reinforced engineering products, and a method for its preparation, including curing to final product form. The IPN composition comprises shaped solid polyester material in a matrix of a curable prepolymer resin capable of interpenetrating with the polyester material, such as a phenolic resin, an interfacial dissolving agent for the polyester, optionally an accelerator for the prepolymer resin, and optionally a filler. It possesses the appropriate desired properties attributable to the prepolymer resin, such as the excellent flame retardancy of phenolic resin, combined with the toughness of polyester.

This IPN composition is made by applying the matrix to the shaped solid polyester material to form a composite, consolidating and heat curing the composite to form a prepreg product, and applying heat and pressure to the prepreg product to form the finally cured structural product.

According to the invention, both the polyester and the prepolymer resin, such as phenolic resin, are already synthesized, the polyester being in solid form and the prepolymer resin being a network resin in, e.g. liquid or flowable, fusible or curable form and capable of interpenetrating with the polyester, and a significant feature is the use of an interfacial dissolving agent that is compatible with the prepolymer resin matrix raw materials, and able to dissolve vicinal polyester portions, penetrate into the polyester mass and diffuse into the interchain spaces of the polyester molecular chains to promote such interpenetrating of the network resin with the polyester.

Accordingly, after final heat curing of the prepolymer resin, an interpenetrating polymer network is formed at the boundary interface between the polyester and the cured prepolymer (e.g. phenolic) resin matrix.

This type IPN composition has not been heretofore prepared, and constitutes a distinct departure from the above prior art. Specifically, according to the invention, the polyester material is an already synthesized polymer while the second component, e.g. phenolic resin, is a prepolymer or oligomer which can be further cured during processing of the IPN composition to provide a unique cured IPN composition.

In general, materials forming IPN compositions fall into the following two categories:

(1) An IPN wherein two independent cross linking polymer networks are interpenetrated with each other, as shown in FIG. 1, and (2) A semi-IPN wherein an independent cross linking polymer network is interpenetrated with a linear polymer, as shown in FIG. 2.

In the case of category (1), as indicated in FIG. 1, P and R are two independent cross linking polymer networks interpenetrating with each other in matrix M of IPN product 1, whereas in the case of category (2), as indicated in FIG. 2, P' is an independent cross linking polymer network which is interpenetrated with a linear polymer R' in matrix M' of semi-IPN product 1'.

The IPN composition according to the invention falls into category (2) in that the independent cross linking polymer network P' is constituted by the network resin, e.g. phenolic resin, and this is interpenetrated with the linear polymer R' as constituted by the polyester material in the matrix M'.

Preferably, the polyester material is polyester containing linear fiber or fabric thereof, or the like, arranged as structurally reinforcing material, e.g. as an elongated continuous web, in definite directional spatial orientation, and the matrix is a paste mixture of said prepolymer resin, interfacial dissolving agent, optional accelerator, and optional filler, which also optionally contains shaped solid polyester material such as polyester containing particles, sheeting, or fiber or fiber fabric, or the like, distributed in the manner of a filler in random directional spatial orientation in the matrix, and especially substantially completely dissolved therein.

According to the invention, an IPN molding composition of the above type can be prepared by mixing said resin, interfacial dissolving agent, optional accelerator, optional filler and/or optional randomly distributable polyester material, into a homogeneous paste matrix, applying the paste matrix to the reinforcing material arranged polyester material, e.g. a woven or nonwoven fiber web, as by coating or dipping, such that part of the attendant polyester is dissolved and penetrated by the matrix, thereafter subjecting the composite to mechanical squeezing pressure to consolidate the composite and then heat curing the consolidated composite to form an IPN prepreg product. The latter can then be hot compression molded to form a finally cured structural product in any selective shape or form.

The instant IPN composition exhibits the toughness of the attendant polyester fiber and/or other polyester material, whether initially only partially or substantially completely dissolved in the matrix, as well as the desired properties of the prepolymer resin component, especially the flame retardancy of the phenolic resin, and after final curing the product is usable as an engineering construction material, such as a light, tough and flame retardant structure.

The instant IPN composition typically comprises:

A. Matrix material:

| 1. Phenolic resin | 100 | parts by weight |
|---|---|---|
| 2. Accelerator | ph < 7 | |
| 3. Interfacial dissolving agent | 0.05-50 | parts by weight |
| 4. Filler | 0-300 | parts by weight |
| 5. Polyester material (dissolved) | 0-100 | parts by weight |

B. Reinforcing material:
Polyester fiber or blend fiber or fabric thereof.

The weight ratio of A (matrix) to B (reinforcing polyester material) is generally about 0.25-15:1, preferably about 1-10:1. As will be appreciated, the amount of filler added will affect this weight ratio significantly.

The prepolymer resin contemplated herein may be any appropriate network resin, preferably a phenolic resin since this type resin has high heat resistance, relatively low cost and other related advantages as the artisan will appreciate. The phenolic resin is preferably a thermosetting phenolaldehyde resin, obtained by polymerization of a fixed proportion of phenol and aldehyde, or their derivatives or analogs, under basic conditions, and is normally of basic pH. This resin contains a complex composition and is affected by reaction temperature, reaction time, pH value, molar ratio of phenol compound to aldehyde compound, catalyst used, and the like, such that when prepared under different conditions, different reaction properties, different viscosity and different processing characteristics will be obtained.

The phenolic resin suitably has a pH value of about 7-10, a solid content of about 10-95%, and a viscosity of about 10-1,000 cps/25° C. Preferably, the resin has a solid content of about 50-60% and a viscosity of about 100-500 cps/25° C.

The molar ratio of phenol to aldehyde in the resin is desirably less than 1:1, such as about 0.5-0.9:1, to provide a molar excess of the aldehyde.

Suitable aldehyde compounds include formaldehyde, acetaldehyde, propionaldehyde, n-butyraldehyde and furfural, formaldehyde being preferred. The corresponding phenol compounds include phenol, and substituted phenols which are substituted with one or more substituents such as alkyl, hydroxy, halo, cycloalkyl, and the like groups, and particularly o-, m- or p-cresol, p-tert.-butyl phenol, p-tert.-amyl phenol, 1,2-dimethyl-3-hydroxybenzene, 1,3-dihydroxybenzene, p-chlorophenol, o-bromophenol, 2-bromo-4-cyclohexylphenol and 2-methyl-4-bromophenol. The preferred phenol compound is phenol.

The phenolic resin may be a resole, i.e. a thermosetting resin synthesized from an aldehyde and phenol via an addition and condensation reaction in alkaline solution of pH>7. In preparing the resole, base catalysts can be used to promote the reaction, such as sodium hydroxide, trimethylamine, etc. Thus, upon reacting phenol with formaldehyde under basic conditions a methylol group containing phenol-formaldehyde resole resin can be formed by addition and condensation reaction.

In particular, high solid content, low molecular weight phenolic resins are contemplated that are highly reactive and thus especially suitable as matrix material.

To accelerate the reaction rate for phenolic resin curing its pH value may be adjusted to less than 7 by the accelerator, which for this purpose may be a weak acid such as toluene sulfonic acid, trifluoroacetic acid, acetic acid, or the like.

The interfacial dissolving agent is specifically included to promote interpenetration of the prepolymer resin, such as the phenolic resin, into and/or by the attendant polyester material, and may be an aromatic alcohol such as a phenol compound, a halohydrocarbon such as a halogenated aliphatic hydrocarbon, or a mixture of the aromatic alcohol and halohydrocarbon. Suitable aromatic alcohols include phenol, polyhydroxy and/or mono to poly alkyl substituted phenols or naphthols, e.g. meta-cresol, and the like, and suitable halohydrocarbons include aliphatic halohydrocarbons such as haloalkane, and particularly chloroalkane, e.g. tetrachloroethane, chloroform, and the like. Suitable mixtures include combinations such as phenol and tetrachloroethane, meta-cresol and chloroform, and the like.

In the case of such mixtures, the proportion of aromatic alcohol to halohydrocarbon in the interfacial dissolving agent may vary widely and is quite arbitrary, but generally may be conveniently about 0.1-10:1.

The filler may be any suitable organic or inorganic filler such as calcium carbonate, magnesium carbonate, clay, fumed silica, carbon black, talc, mica, alumina, red mud (i.e. a residual product of the aluminum industry, obtained from bauxite after the extraction of aluminum oxide with alkali solution), calcium silicate, calcium sulfate, barium sulfate, glass powder, wood powder or sawdust, and the like. These fillers are added to the matrix to reduce the cost and at the same time to modify selectively the end product properties.

In a typical case, red mud may be used as filler having the following general analysis: 14.6% $SiO_2$, 22.6% $Al_2O_3$, 9.1% $Na_2O$, 7.2% $TiO_2$, 35.6% $Fe_2O_3$, 10.9% other.

The particle size of the given filler in the usual case will generally not be greater than about 1 mm, and is preferably between about 1-500$\mu$.

The polyester material used as reinforcing material in the instant IPN composition, i.e. arranged as structurally reinforcing material in definite directional spatial orientation in the matrix, may be any new or reused polyester containing linear fiber or blend fiber or its fabric, and the like, i.e. elongated fiber material, such as polyester containing roving, yarn, cotton blends used in man-made fibers, nonwovens, fabrics of such fibers, e.g. webs, or waste fiber or fabric, etc., and mixtures thereof. Such material is typically used in elongated form for continuous production of sheeting type prepreg products, e.g. provided as continuous roving or fabric webbing extending along the processing system travel path.

The polyester material used as randomly distributable material in the manner of a filler, i.e. distributed in random directional spatial orientation in the matrix, may be any new or reused polyester containing powder or granule particles, i.e. particulate material, or sheeting, and the like, as well as the aforesaid fiber or fiber fabric. These are typically of reduced size to permit their random distribution in the matrix, such that the sheeting, e.g. polyester bottles or other forms or shapes of sheeting, and the fibers or fiber fabrics, may be crushed, shredded or chopped to provide short strips or pieces of sheeting or fabric, or short lengths of yarn, roving or fiber strand materials, e.g. chopped strands, and desirably particulate material of size and shape analogous to conventional fillers, especially for facilitating substantially complete dissolving thereof in the matrix as is preferred.

Using waste or recycled polyester material herein, e.g. crushed bottles, alleviates waste disposal problems and reduces production costs for the IPN composition raw materials.

The instant polyester material may comprise any conventional polyester of suitable molecular weight. The term "polyester" is used broadly herein to include any aromatic and/or aliphatic linkage unit containing organic linear step growth polymeric ester, in the form of a normally solid, and thus shaped, mass, e.g. containing units of the formula

end stopped by hydroxyl, carboxyl, carboxylic acid ester, and the like, terminal groups, such as high molecular weight polyester diols of the formula

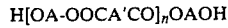

wherein correspondingly n is an integer from about 100–10,000, and A and A' are individually a divalent straight or branched chain, saturated or unsaturated aliphatic hydrocarbon, e.g. having 1–12 carbon atoms, and/or an aromatic hydrocarbon, e.g. optionally substituted phenylene, biphenylene, and naphthylene.

The A and A' groups may be optionally mono or poly substituted with alkyl, halo, and/or hydroxy, and the like.

Contemplated are aromatic and/or aliphatic polyesters derived from such carboxyl containing monomers as aromatic or aliphatic dicarboxylic acids, esters and anhydrides, and such hydroxyl containing monomers as aliphatic or aromatic diols.

The carboxyl containing monomers include such aromatic monomers as terephthalic acid, and its dimethyl or other ester; such saturated aliphatic monomers as endomethylene tetrahydrophthalic acid, fumaric acid, adipic acid, sebacic acid, malonic acid, and glutaric acid; and such unsaturated aliphatic monomers as maleic acid, maleic anhydride, citraconic acid, mesaconic acid, and itaconic acid. The hydroxyl containing monomers include such saturated aliphatic diols as ethylene glycol, propylene glycol, diethylene glycol, and dipropylene glycol; such unsaturated aliphatic diols as 2-butene-1,4-diol; and such aromatic diols as benzenediol, and naphthalenediol.

Specific polyesters, e.g. of about 200–30,000 molecular weight, are polyethylene succinate, polypropylene adipate, polyethylene azelate, poly(1,3-butanediol)sebacate, poly(diethylene glycol)adipate, poly(1,6-hexanediol)adipate, and polypropylene phthalate. An especially useful shaped solid polyester material is polyethylene terephthalate (PET).

All such polyesters as contemplated by this invention are thermoplastic linear polymers which can be dissolved partially or completely by heating in the interfacial dissolving agent, as the case may be, whereby to accelerate the interpenetrating rate of the prepolymer resin, e.g. phenol/formaldehyde resin, into and/or by the already synthesized polyester.

Typical IPN compositions herein comprise, by weight, 100 parts basic pH phenolic resin; about 0.05–50, preferably 0.1–20, parts interfacial dissolving agent; about 0–300, preferably 50–100, parts filler; weak acid as accelerator in an amount to provide a matrix ph<7; and an amount of attendant polyester material providing a matrix to polyester weight ratio of about 0.25–15:1, preferably 1–10:1, or 0.25–9:1 (90–10% matrix/10–80% polyester), or 1–4:1 (80–50% matrix/20–50% polyester).

The method of preparing the instant IPN composition essentially involves mixing the matrix materials into a homogeneous paste, and then using the coating or dipping method to prepare a prepregnating sheet molding composite or prepreg product, followed by appropriate curing to final product form.

Per the coating method, the matrix paste is coated onto both sides of the polyester material, e.g. as a continuous web, in a fixed proportion of matrix to polyester material, and the resulting composite is consolidated under mechanical squeezing pressure to achieve uniform matrix impregnation of the polymer material, followed by heating, e.g. at 60°–90° C., to make a tack-free, partially cross linked semi-finished prepreg product (B stage), as shown in FIG. 3.

Per the dipping method, analogously the polyester material, e.g. as a continuous web, is dipped into a matrix paste bath for applying the matrix in a fixed proportion to the polyester material, and the resulting composite is consolidated to achieve such polymer material impregnation, followed by heating, e.g. at 60°–90° C., to make a tack-free semi-finished prepreg product (B stage), as shown in FIG. 4.

The polyester fiber content of the semi-finished product, whether made by such coating method or dipping method is suitably about 10–80%, preferably 20–50%.

This semi-finished product may be stored on a roll or cut into short lengths of desired size. It is termed a prepregnation or prepreg, in that it constitutes a semi-processed, shapeable, intermediate ribbon or sheet type product in which the polyester fiber, fabric or the like, is infiltrated by the phenolic resin, and then partly cured (B-staged) to fix the geometry of the combined reinforcing material and resin, while allowing enough shape relaxation, i.e. drape, and adherence, i.e. tack, to permit its handling for further processing.

The B stage semi-finished product prepared by either the coating method or dipping method is thereafter subjected to heat and pressure for final curing, e.g. the semi-finished product is hot pressed under a mechanical pressure of about 100–150 kg/cm$^2$ at a temperature of about 100°–200° C. for about 1–15 minutes to produce a desired compression molded finally cured product. Of course, these conditions can be varied to accommodate products of different shapes and/or compositions.

As shown in FIG. 3, the coating method may be carried out per coating system 30, by feeding polyester fiber web 31 from roll 32a to conveying path 33 for applying matrix paste 34a and 34b via doctors 35a and 35b to both sides of web 31, after which polyethylene films 36a and 36b, from rolls 37a and 37b, are guided by rolls 37aa and 37bb onto both matrix coated sides of web 31, to form composite 31a then passed between squeeze rolls 38a and 38b for uniform impregnation and consolidation of the paste in the web, whereupon the composite is heat cured by heaters 39a and 39b in a heating chamber to form prepreg product 31b fed to storage roll 32b.

The outer covering polyethylene films 36a and 36b serve to prevent staining when the composite is pressed between squeeze rolls 38a and 38b prior to heat curing.

As shown in FIG. 4, the dipping method may be carried out per dipping system 40, by feeding polyester fiber web 41 from roll 42a to conveying path 43 and into matrix paste 44 in bath 45 via guide rolls 46 to apply the paste to both sides of web 41 and form composite 41a then passed between squeeze rolls 48a and 48b for uniform impregnation and consolidation of the paste in the web, whereupon the composite is heat cured by heaters 49a and 49b to form prepreg product 41b fed by rolls 47 to storage roll 42b.

FIG. 5 shows a dipping system 50, like dipping system 40 of FIG. 4, which operates in the same way, by feeding polyester fiber material web 51 from roll 52a to conveying path 53 and into matrix paste 54 in bath 55 via guide rolls 56 to apply the paste to both sides of web 51 and form composite 51a then passed between squeeze rolls 58a and 58b for uniform impregnation and consolidation of the paste in the web, whereupon the composite is heat cured by heaters 59a and 59b to form prepreg product 51b, but in this case fed by rolls 57 for cutting by cutter 52b into short lengths of cut product 52c.

The prepreg product, as a continuous web or cut into short lengths, is then processed for final curing, e.g. by said hot compression, to provide structurally reinforced engineering materials having manifold applications. A very useful application of the instant IPN composition cured product is as a building product such as a corrugated board, especially a flame retardant corrugated board in place of known asbestos based corrugated board formed by binding of asbestos with organic binder, which is heavy, flammable to some extent because of the inclusion of such organic binder, and carcinogenic.

To the extent that the polyester material and optional filler are provided as recycled or waste materials, the invention achieves a reduction in the materials cost and in the otherwise present waste disposal problem and conjoint environmental pollution problem regarding such waste materials.

The uniqueness of this invention is manifested in its application of lightweight, high strength thermoplastics such as linear polyester as reinforcing material in resin network systems such as flame retardant phenolic resin systems to provide compression molded engineering materials of good mechanical properties, traceable to the partial dissolving of the surface of this reinforcing material by the interfacial dissolving agent added to the prepolymer resin matrix whereby to form the instant curable IPN compositions.

The produced cured polymer composition in general constitutes a matrix formed of a network of cross linked phenolaldehyde resin units, and interpenetrating polyester units which remain linked to one another by the usual linear linkage units, yet which are also locally cross linked via reaction at receptive functional sites to like sites of the phenol-aldehyde resin units by reason of the activation of such sites per the partial dissolution of the polyester by the interfacial dissolving agent. In particular, the phenol-aldehyde units include linkages formed from hydroxy groups in the network thereof and ester linkages of the linear polyester chains.

The following examples are merely illustrative of preferred embodiments of the invention. Many variations thereon may be made without departing from the spirit of the disclosed invention, as will be evident to those skilled in the art, and such variations are intended to come within the scope of what is claimed.

EXAMPLE A

Phenolic Resin Synthesis

To provide a phenol/formaldehyde mole ratio equal to 0.8, 1882 g (20 moles) of molten phenol and 2007 g of 37% (750 g; 25 moles) aqueous formalin were charged into a 5-liter three-necked reactor fitted with a stirrer, condenser and thermometer. The formalin and phenol were mixed thoroughly for about 10 minutes, and then 130 ml of sodium hydroxide (NaOH) solution (20% wt/wt) were added slowly. The pH value of the reaction mixture was adjusted to 7.5-10.5, and the temperature was then raised to 70°-95° C. When the reaction temperature rises to 80° C. it is necessary to apply a vacuum to the reaction system to remove excess heat so as to keep the reaction mixture being refluxed within the 70°-95° C. range.

At this stage, the resin changed from clear to a straw color. The resin was heated under reflux for several hours, and then cooled to 50° C. By adding approximately 140 ml of 10% wt/wt aqueous $H_2SO_4$ at this temperature, the pH value of the reaction mass was adjusted to about 7.5. While keeping the temperature below 50° C., 1140 cc of water were removed from the reaction mass under vacuum, and a straw colored resole was obtained which had a free phenol content of 5%, a water content below 5%, a viscosity of about 400 cps/25° C., and a solid content of about 50%.

EXAMPLE 1

Phenolic resin of 50% solid content and basic pH, having a phenol/formaldehyde mole ratio of <1 and a viscosity of 400 cps/25° C., prepared per the procedure of Example A, clay as filler in a weight ratio of phenolic resin to clay of 1:0.5, and tetrachloroethane as interfacial dissolving agent in a weight ratio of phenolic resin to tetrachloroethane of 1:0.1, were mixed to form a homogeneous paste matrix. Sufficient toluene sulfonic acid was added as resin accelerator to adjust the paste matrix to weak acidity, i.e. to a resin pH value of 5-6.5.

Nonwoven polyester fiber (polyethylene terephthalate, PET) as structurally reinforcing material was impregnated with the paste matrix by either the coating method (FIG. 3) or the dipping method (FIG. 4), with the paste matrix and polyester fiber amounts being controlled to provide a constant 3:1 weight ratio of the matrix to the polyester fiber, and with the fiber reinforcing material being arranged in definite directional spatial orientation in the matrix.

The resulting composite was consolidated and heat cured at 60°-90° C. to semi-finished (stage B) form. This semi-finished interpenetrating polymer network composition was then placed on a hot press for compression molding at 100-150 kg/cm$^2$ and 150° C. for 15 minutes to form the finally cured IPN end product.

Specimens of the end product of this example were subjected to various test to determine pertinent physical properties thereof, and the results are listed in Table 1.

EXAMPLE 2

The procedure of Example 1 was repeated, except that the weight ratio of phenolic resin to clay was changed to 1:0.75.

Specimens of the end product of this example were subjected to various test to determine pertinent physical properties thereof, and the results are listed in Table 1.

EXAMPLE 3

The procedure of Example 1 was repeated, except that the weight ratio of phenolic resin to polyester fiber was changed to 2.5:1.

Specimens of the end product of this example were subjected to various test to determine pertinent physical properties thereof, and the results are listed in Table 1.

EXAMPLE 4

The procedure of Example 1 was repeated, except that the clay was replaced by red mud as filler, but at the same weight ratio of phenolic resin to filler of 1:0.5.

Specimens of the end product of this example were subjected to various test to determine pertinent physical properties thereof, and the results are listed in Table 1.

EXAMPLE 5

The procedure of Example 1 was repeated, except that additional polyester material in powder form, obtained from crushed PET bottle waste product recycled material, was added directly to the matrix and distributed in the manner of a filler in random directional spatial orientation therein, in a weight ratio of phenolic resin to powdered PET of about 1:0.1, such that the powder was substantially completely dissolved in the matrix.

Specimens of the end product of this example were subjected to various test to determine pertinent physical properties thereof, and the results are listed in Table 1.

TABLE 1

| | Physical Properties of IPN Product | | | |
|---|---|---|---|---|
| Example | Oxygen Index* | Tensile Strength (Kg/cm$^2$) | Bending Strength (Kg/cm$^2$) | Izod Impact Notched (ft-lb/in$^2$) |
| 1 | 28.9 | 194.9 | 393.0 | 1.75 |
| 2 | 28.9 | 157.8 | 427.8 | 1.34 |
| 3 | 27.8 | 136.8 | 375.9 | 1.58 |
| 4 | 28.9 | 190.5 | 396.0 | 2.20 |
| 5 | 25.2 | 175.6 | 325.1 | 1.92 |

*Oxygen index is the value result of a flammability test performed on the specimen according to ASTM D 2863-77.

It will be seen from Table 1, that as compared to Example 1, when the clay filler amount is increased by 50% in Example 2 (0.75−0.5=0.25; 0.25/0.5=50%), there is a decrease in tensile strength and impact value but an increase in bending strength, whereas when the clay filler per Example 1 is replaced by red mud as filler in Example 4 yet at the same amount, the tensile strength is only slightly decreased and the bending strength slightly increased, while the impact value is significantly increased by this filler.

As will also be seen from Table 1, compared to Example 1, when the polyester fiber amount is increased by 17.5% in Example 3 (3:1=1:0.33; 2.5:1=1:0.4; 0.4−0.33=0.07; 0.07/0.4=17.5%), there is a decrease in the oxygen index, tensile strength, bending strength and impact value, whereas when additional polyester material is added in random manner to and dissolved in the matrix itself in Example 5, there is similarly a decrease in the oxygen index, tensile strength and bending strength, while the impact value is increased.

These results indicate the selectable variations in physical properties that may be achieved according to the invention by suitable adjustment of the ratio of matrix to toughness imparting polyester material and/or of the type and amount of filler, relative to the phenolic resin, yet in all cases the presence of the phenolic resin as matrix material assures that the product will possess excellent flame retardancy properties. By inclusion of the polyester material as structural reinforcing material, the final cured product provides a composition form readily usable as a structural engineering material.

We claim:

1. An interpenetrating polymer network composition, comprising solid polyester fibers or polyester fiber blends in the form of a continuous web embedded in a matrix of a flowable phenolic prepolymer resin, said resin interpenetrating the polyester fibers, an interfacial dissolving agent for the polyester fiber or polyester fiber blends selected from aromatic alcohols, halocarbons or mixtures thereof, and optionally a filler.

2. Composition of claim 1 wherein the phenolic prepolymer resin is a thermosetting phenol-aldehyde resin of basic pH and a weak acid is optionally included as accelerator therefor.

3. Composition of claim 2 wherein the phenolic prepolymer resin is a phenol-formaldehyde resin.

4. Composition of claim 1 wherein the aromatic alcohol is a phenol compound and/or the halohydrocarbon is a halogenated aliphatic hydrocarbon.

5. Composition of claim 1 including an organic or inorganic filler.

6. Composition of claim 1 wherein the polyester material is distributed in the manner of a filler in random directional spatial orientation in the matrix.

7. Composition of claim 1 wherein the polyester material is in the form of polyester containing linear fiber or fiber fabric arranged as structurally reinforcing material in definite directional spatial orientation in the matrix.

8. Composition of claim 1 comprising 100 parts by weight of a phenolic prepolymer resin of basic pH, about 0.05–50 parts by weight interfacial dissolving agent, about 0–300 parts by weight filler, a weak acid as accelerator for the resin in an amount to provide the matrix with a pH less than about 7, and an amount of polyester material sufficient to provide a weight ratio of matrix to polyester material of about 0.25–15:1.

9. Method of making a structural product having an interpenetrating polymer network composition, comprising
   applying a matrix to solid polyester fibers or polyester fiber blends in the form of a continuous web embedded in said matrix to produce a composite, the polyester material being in the form of a linear fiber or fiber fabric arranged as structurally reinforcing material in definite directional spatial orientation, and the matrix being a flowable prepolymer resin capable of interpenetrating with the polyester fibers, an interfacial dissolving agent for the polyester fibers, and optionally a filler, subjecting the composite to mechanical squeezing pressure to consolidate the composite and then heat curing the consolidated composite to form a prepreg product, and applying heat and pressure to the prepreg produce to form a finally cured structural product.

10. Method of claim 9 wherein the composite contains a filler in random directional spaced orientation in the matrix and substantially completely dissolved therein, the weight ratio of the matrix to the total polyester material being about 0.25-15:1, the resin being a thermosetting phenol-aldehyde resin of basic pH; wherein the composite is produced by coating the matrix onto both sides of the web or by dipping the web into a bath of the matrix; wherein the prepreg product is formed by squeezing the composite between pressure rolls and then heat curing the squeezed composite at about 60°-90° C.; and wherein the finally cured product is formed by the hot compression molding of the prepreg product in a hot press at about 100-150 kg/cm² and about 100°-200° C. for about 1-15 minutes.

11. Structurally reinforced interpenetrating polymer network flame retardant composition product, comprising solid polyester fibers or polyester fiber blends in the form of a continuous web of a linear fiber or fiber fabric arranged as structurally reinforcing material in definite directional spatial orientation in a matrix of cured phenolic resin; and optionally a filler; the resin, prior to curing, being a flowable phenolic prepolymer resin interpenetrating the polyester material in the presence of the interfacial agent for dissolving the surface of the polyester material.

12. The polymer network of claim 11 including a filler in random directional spatial orientation in the matrix and substantially completely dissolved therein, and with which the prepolymer also interpenetrates.

13. The polymer network of claim 11 wherein the resin is a thermosetting phenol-aldehyde resin of basic pH, and the interfacial dissolving agent is an aromatic alcohol, a halocarbon, or a mixture thereof.

14. Product of claim 11 comprising 100 parts by weight phenolic resin, about 0.05-50 parts by weight interfacial dissolving agent, about 0-300 parts by weight filler, and an amount of polyester material sufficient to provide a weight ratio of matrix to polyester material of about 0.25-15:1.

15. The interpenetrating polymer network composition of claim 1 wherein the prepolymer has a viscosity of from 100 to 500 cps at 25° C.

16. The interpenetrating polymer network composition of claim 1 wherein the polyester fiber has a molecular weight of from 200 to 30,000.

17. The interpenetrating polymer network composition of claim 1 wherein the ratio of the matrix to the polyester is from 0.25 to 15:1.

18. The interpenetrating polymer network composition of claim 1 wherein the composition comprises from 10 to 80% by weight of polyester fiber.

* * * * *